United States Patent [19]

Schneemann

[11] 4,036,484
[45] July 19, 1977

[54] COLLET LOCKING AND OPERATING MECHANISM THEREFOR

[76] Inventor: Anthony K. Schneemann, 25761 Briarbank, Southfield, Mich. 48075

[21] Appl. No.: 698,039

[22] Filed: June 21, 1976

[51] Int. Cl.$^2$ .............................. B23Q 1/16; 29 38 C
[52] U.S. Cl. ................................. 269/57; 29/38 C; 279/4; 279/50; 408/71
[58] Field of Search ............... 269/56, 27; 279/4, 50; 408/71

[56] References Cited

U.S. PATENT DOCUMENTS

| | | | |
|---|---|---|---|
| 2,801,110 | 7/1957 | Squiller | 279/50 |
| 3,720,475 | 3/1973 | Leacock | 408/71 |

*Primary Examiner*—Al Lawrence Smith
*Assistant Examiner*—Robert C. Watson
*Attorney, Agent, or Firm*—Harness, Dickey & Pierce

[57] ABSTRACT

Advancing mechanism for a series of fixtures having collets for workpieces are actuated by a fluid actuated double-acting cylinder to lock and unlock the collet. A driven rotatable table has a plurality of equally spaced fixtures mounted thereon which are advanced seriatim to a plurality of machining stations where work is performed thereon. Each advancement moves a fixture to the unloading and loading station where the collet is released, the finished workpiece removed and a workpiece to be machined placed within the collet. The double-acting cylinder was actuated by the fluid to release the collet and after a workpiece was placed therein a reversal of the fluid clamped the collet in secured position. The collet is locked and unlocked by the operation of a transverse pin in a sloping slot in a sleeve which is advanced over the collet to move the sections of the head into clamped position to hold the workpiece. The table is driven to advance the collets the distance the fixtures are spaced apart and are accurately located by a shot pin which enters a hole in the table. Thereafter a dwell time is provided during which work is performed on the workpieces located at each of the stations. Any number of stations may be provided depending upon the number of machining operations to be performed.

8 Claims, 5 Drawing Figures

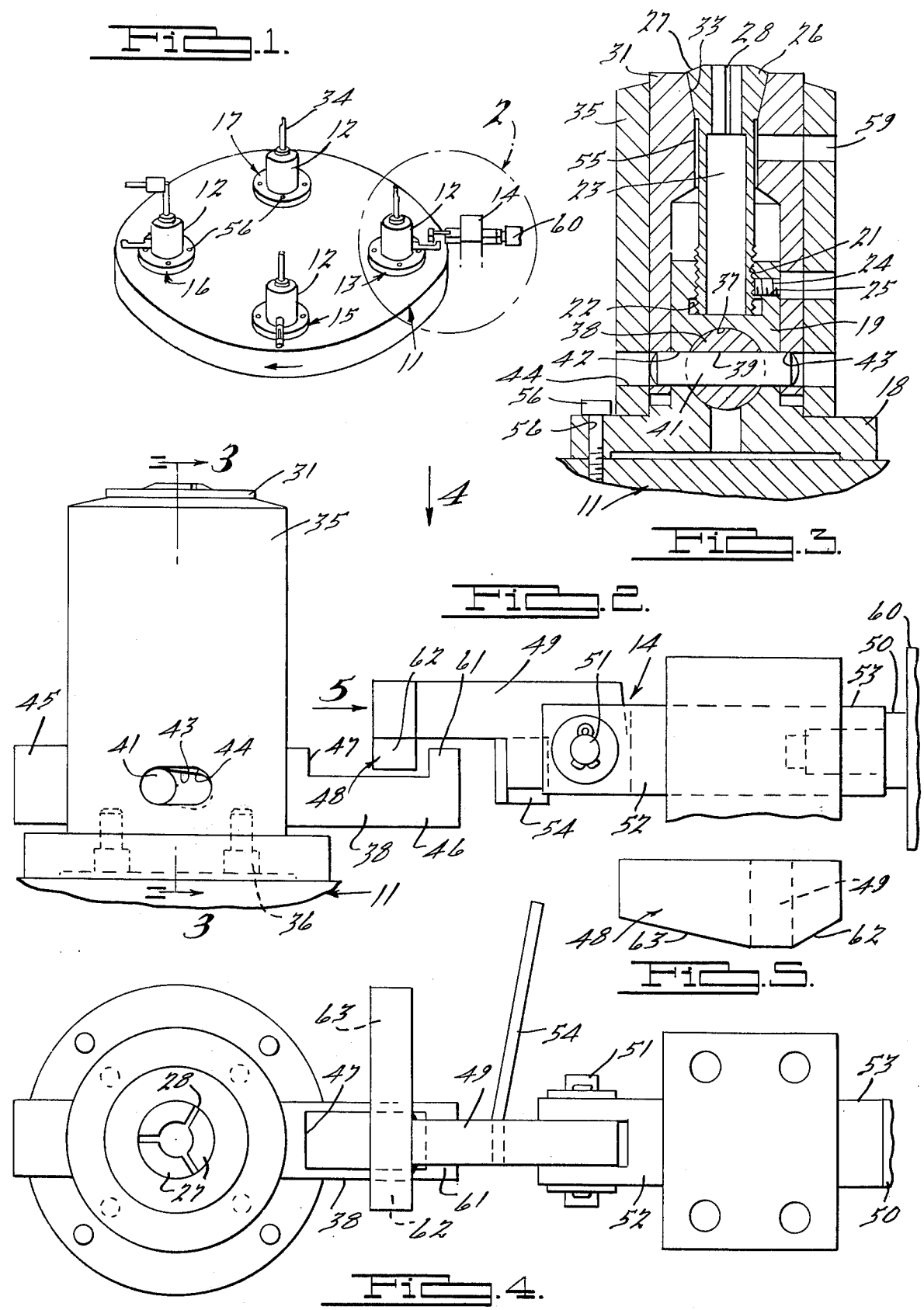

4,036,484

COLLET LOCKING AND OPERATING MECHANISM THEREFOR

BACKGROUND OF THE INVENTION

A search of the art uncovered the following patents showing various ways of clamping workpieces in a fixture. U.S. Pat. Nos.:

666,905; 766,403; 1,027,419; 1,438,250; 1,740,934; 1,883,993; 2,060,158; 2,337,528; 2,407,985; 2,415,037; 2,427,712; 2,472,022; 2,639,491; 2,873,628; 2,946,583; 3,020,998; 3,024,184; 3,395,911; 3,424,319; 3,727,906; 3,802,688; 3,908,813.

SUMMARY OF THE INVENTION

The invention pertains to a fixture having a workpiece supporting collet therein, a plurality of which are mounted adjacent to the edge of a rotatable table and advanced to work performing stations from and to a loading and unloading station. An actuating device is provided at the loading and unloading station with which the actuating element on each of the fixtures become aligned as the fixtures are advanced to the station. A double-acting fluid operated cylinder operates the actuating device to move the collet clamping member to released position to permit the finished workpiece to be removed and to move it to clamped position after the workpiece to be machined is placed within the collet. A sleeve is moved upwardly over the collet head by the operation of a transverse pin in an angularly disposed slot which moves the sleeve to clamped position which remains clamped until released by the actuating element.

BRIEF DESCRIPTION OF THE DRAWING

FIG. 1 is a perspective view of a rotatable table having a plurality of equally spaced fixtures thereon which are advanced seriatim to a plurality of work stations and to an actuator at a loading and unloading station which embodies fixtures of the present invention;

FIG. 2 is a view in elevation of a fixture illustrated in FIG. 1, as viewed within the circle 2 thereof;

FIG. 3 is a sectional view of the structure illustrated in FIG. 2, taken on the line 3—3 thereof;

FIG. 4 is a plan view of the structure illustrated in FIG. 2, and

FIG. 5 is a view of the structure illustrated in FIG. 4, as viewed from the point 5 thereof.

DESCRIPTION OF THE PREFERRED EMBODIMENT

The machine of the present invention has a circular table 11 which, in the present instance, is driven in rotation 90° each advancement with a dwell time therebetween. The 90° advancement results from the use of four fixtures 12 which are secured to the table equal increments apart. The location of the fixture 12 at the unloading and loading station 13 permits the unloading and loading of the workpiece through the operation of an actuating device 14. The table is rotated clockwise and advanced to a first work station 15 at which a machining operation is performed. The next advancement moves the workpiece to a second work station where a second work performing operation takes place. The next advancement moves the workpiece to a third work station at which a third machine operation is performed. After the three work operations have been performed on the workpiece, the fixture is advanced to the unloading and loading station 13 where the actuating device 14 releases the collet to permit the finished workpiece to be removed. A workpiece to be machined is placed in the collet and upon the movement of the actuating device 14 in the opposite direction, the workpiece is clamped within the collet.

As illustrated in FIGS. 2, 3 and 4, each collet has a circular base 18 which is provided with a central cylindrical portion 19 which has a central threaded aperture 21 which is recessed at the bottom 22. The threaded end of a collet body 23 is screwed into the threaded aperture 21 and a set screw 24 secured in a threaded aperture 25 in the body engages the thread of the collet body and prevents it from turning.

The collet body 23 has a head 26 of truncated conical shape being divided into three sections 27 by spaced slots 28 disposed therebetween, as illustrated in FIG. 4. A sleeve 31 has a central truncated conical recess 33 which engages the truncated conical surface of the collet head 26 when the sleeve 31 is moved upwardly to move the three sections 27 thereof inwardly to clamp a workpiece 34 within the fixture 12. The sleeve 31 is enclosed by an outer sleeve 35 which is secured to the circular base 18 by a plurality of screws 36. An aperture 37 is provided through the cylindrical extension 19 of the base 18 and through the sleeves 31 and 35 in which an actuating pin 38 is disposed for longitudinal movement. The pin 38 has an aperture 39 at right angles to its longitudinal length in which a pin 41 is frictionally secured to have both ends extend beyond the body of the actuating pin 38. The ends of the pin 38 extends through diametrical slots 42 in the cylindrical extension 19. The slots 42 at each side of the pin 38 permits the pin 41 and 38 to be moved along the axis of the pin 38. The sleeve 31 has slots 43 at diametrically opposite sides through which the pin 41 extends. The slots 43 are slightly inclined, at less than 10° or at such a small angle as to prevent a reversed operation, that is to say, the downward force on the sleeve 31 cannot actuate the pin 38 axially to thereby provide a lock for the collet.

Diametrical slots 44 are provided at opposite sides of the sleeve 35 through one of which the pin 41 is advanced when forced through the aperture 39 of the actuating pin 38. The slots 44 provide recesses on the inner walls in which the ends of the pin 41 are movable. The pin 38 has an end 45 on the side toward the central axis of the table and an end 46 on the side toward the table edge. The end 46 has a slot 47 cut in the top portion thereof for receiving the collet closing finger 48 of the actuating mechanism 14 at the unloading and loading station 13. The finger 48 is supported below an arm 49 which is secured by a pivot 51 to a bifurcated pin 52 which has its end 53 connected to a piston rod 50 of a fluid operated double acting cylinder 60. When a fixture 12 is advanced to the station 13, the finger 48 is disposed within the slot 47 and the operation of the cylinder 60 to the left moves the arm 49 to the left causing the pins 38 and 41 to move to the left to thereby cam the sleeve 31 downwardly to release the sections 27 of the head 26 and release the finished workpiece 34. The workpiece is then removed and a workpiece 34 to be machined is inserted within the collet. The cylinder has the fluid reversed therein to move the arm 49 to the right to thereby have the finger 48 extending into the slot 47 move the pins 38 and 41 to the right, as viewed in FIGS. 2 and 4. This causes the pin 41, operating in the slots 43, to move the sleeve 31 upwardly and clamp the collet onto the workpiece 34. At the end of the dwell time the table 11 is advanced 90° to advance the workpieces to the next adjacent work station at which the shot pin accurately locates the fixtures and the work so that during the dwell time the three machine operations will be performed while the finished workpiece is removed and a new workpiece secured within the collet.

A cam (not shown) may be employed for advancing the table to move the fixtures and workpieces to an advanced station where the fixture and workpiece is accurately located by a shot pin with the return movement of the ram regulated to provide the dwell time during which the machining operations are performed at the stations. A motor may be employed to drive a cam through a worm and worm wheel to provide an initial shorter time for advancing the table the distance between the machining stations while retaining the additional cam movement for a predetermined greater length of time which provides the dwell time during which the machine operations are being performed. Any other type of drive, known in the art to be suitable, may be employed for advancing the table between stations and provide the time thereafter for the machining operations.

A passage 55, about the collet body 23 communicates with the slots 28 which divides the collet head into sections 27, is joined to a passageway 59 through the outer sleeve 35 and sleeve 31. This permits a flow of air to be directed into the passageway 59, the passage 55 and through the slots 28 to blow out any chips which may collect from time to time within the slots. The actuating arm 49 carries a deflecting finger 54 located in the path of advancement of the end of the actuating pin 38 which is normally limited in axial movement by the pin 41 within the slot 44. Should the pin 41 fail to retain the actuating pin 38 within this limit of movement, the end finger 61 may move outwardly sufficient to engage the face of the deflecting finger 54 which will move the actuating pin 38 to the left to move the end finger 61 back into a position between the base of the deflecting finger 54 and the actuating finger 48.

The actuating finger has a sloping surface 62 at the forward end and a longer sloping surface 63 at the rearward end which raises the arm 49 upwardly about the pivot 51 if in the path of advancement of the actuating pin 38 to prevent damage thereto. In any case, the finger 61 will always be positioned between the finger 48 and the base of the deflecting finger 54. With this arrangement, the movement of the actuating device 14 to the left will have the base of the finger 54 engage the end 61 of the pin 38 and move it to the left to move the sleeve 31 downwardly to thereby release the collet head 26. The movement of the actuating device 14 to the right will cause the finger 48 to advance toward the right to engage the finger 61 to advance the actuating pin 38 and pin 41 to the right. The pin 41 moves in the sloping diametrically disposed slots 43 in the sides of the sleeve 31 to move it upwardly and thereby clamp the segments 27 of the head 26 about the workpiece to secure it in firm fixed relationship therewith. As pointed out above, the slope of the slot 43 is such as to prevent the reverse axial movement of the actuating pin 38 so as to have it retained in locked position as it is advanced from the unloading and loading station to the various working stations.

I claim:
1. A clamping fixture comprising,
   an angularly advanceable table having a plurality of fixtures thereon movable to a loading and working station,
   each of said fixtures having a base containing a central threaded aperture,
   a collet body having an external thread connected to the thread of the aperture,
   a truncated conical head on the end of said body having a central aperture communicating with slots through the head to form sections,
   a collet sleeve about said collet body having a truncated conical recess which receives said collet head,
   and means to advance and retract said sleeve to clamp and unclamp the collet head, said means including an actuating pin movable normal to the collet, a transverse pin through said actuating pin extending through diametrical slots in said base and through diametrical disposed slots in the collet sleeve which are positioned at a small angle to provide a lock for securing the collet sleeve in locked engagement with the collet head when a workpiece is disposed therewithin, and
   an actuating device provided at the loading station which moves the actuating pin of the fixture thereat longitudinally in both directions to unlocked and locked positions.

2. In a fixture as recited in claim 1, wherein the actuating device has a finger pivoted to an advanceable element which provides spaced pull and push faces for operating the actuating pin longitudinally.

3. In a fixture as recited in claim 2, wherein the pushing face has a deflecting arm disposed in the direction of the advancing movement of the table and fixtures which returns the actuating pin of the approaching fixture to its normal position should it become extended.

4. In a fixture as recited in claim 3, wherein the actuating device has a transversely disposed element on the finger which has a forward and rearward sloping surface to cause the finger to be raised should either surface engage a projecting portion of the actuating pin.

5. In a fixture as recited in claim 4, wherein the actuating pin has a slot therein which is advanced to have the transversely disposed element extend therein when the fixture reaches the unloading station.

6. In a fixture as recited in claim 5, wherein the advancement of the actuating device to the left moves the sleeve downwardly and unclamps the collet so that the finished workpiece can be removed and when advanced to the right moves the pin to the right to thereby raise the sleeve and clamp a workpiece to be machined within the collet.

7. In a fixture as recited in claim 6, wherein the device is advanced and retracted by a double acting cylinder through the reversal of the flow of fluid therein.

8. In a fixture as recited in claim 1, wherein means is provided for advancing the table the distance between the fixtures, and means providing a dwell time in which the work operations are performed before the table is again advanced.

* * * * *